Aug. 26, 1930.  A. J. HAND  1,774,000
MAKING SPIRAL WELDED PIPE
Filed Oct. 18, 1927
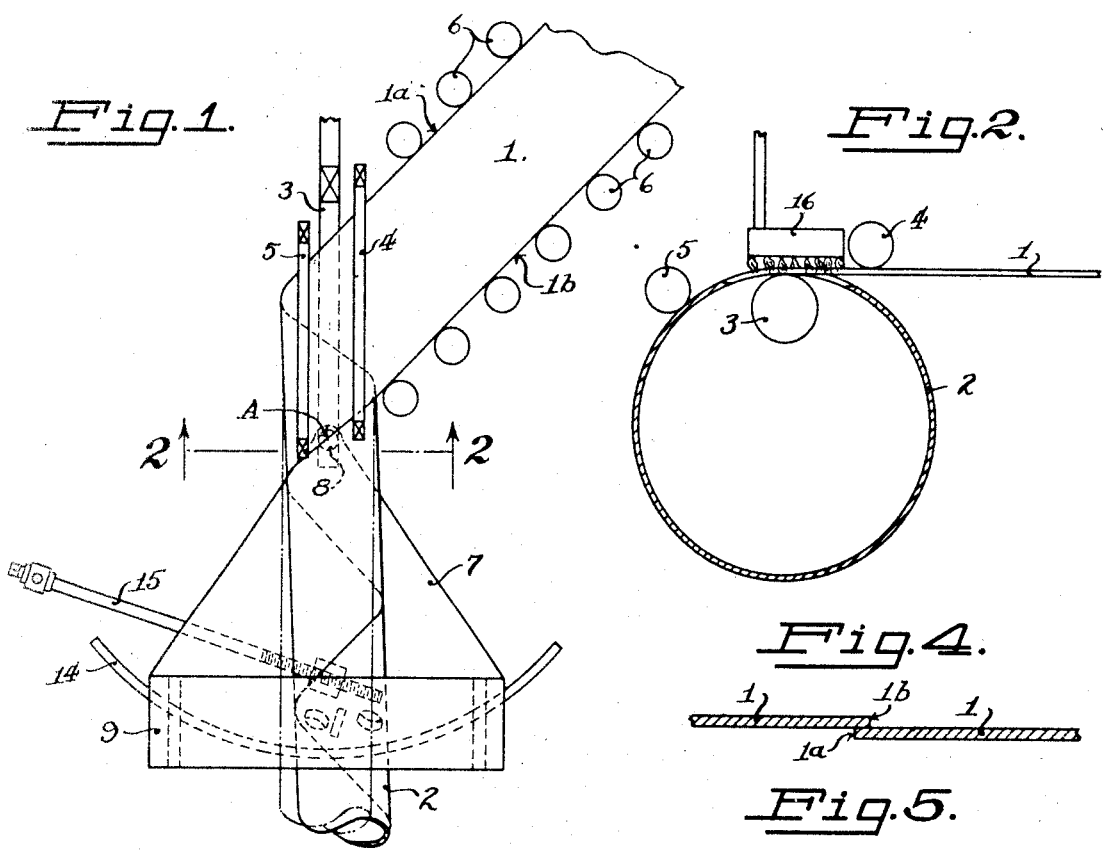
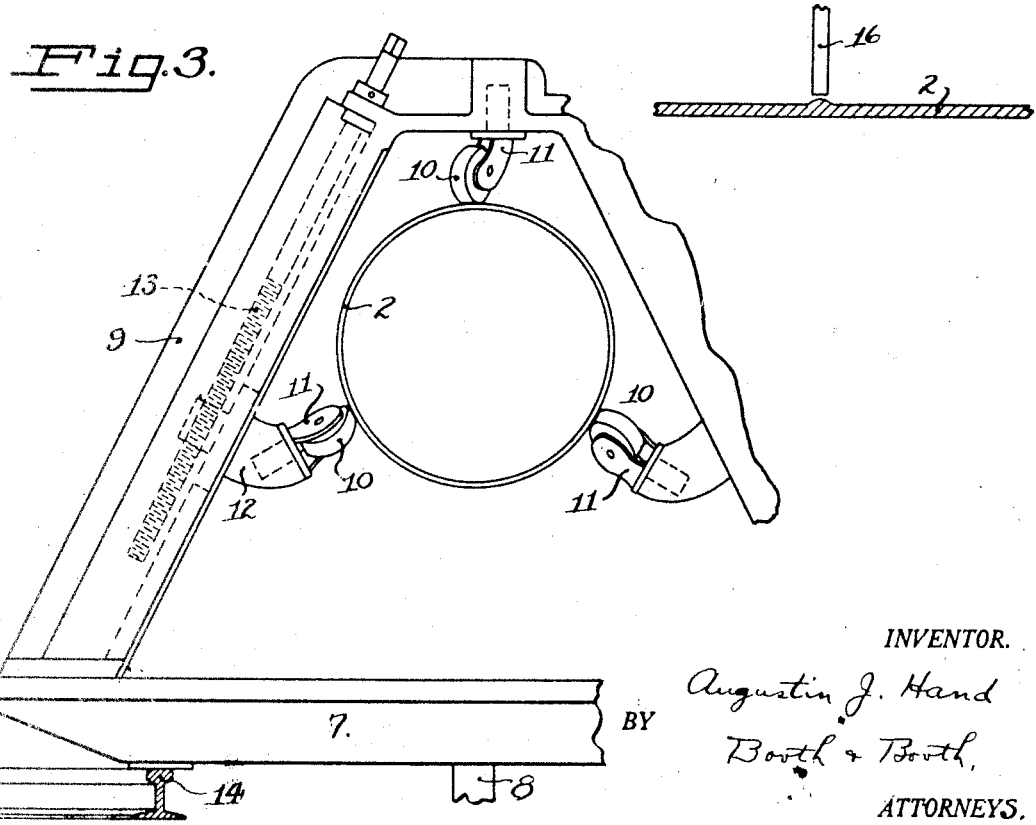
INVENTOR.
Augustin J. Hand
BY Booth & Booth,
ATTORNEYS.

Patented Aug. 26, 1930

1,774,000

UNITED STATES PATENT OFFICE

AUGUSTIN J. HAND, OF BERKELEY, CALIFORNIA, ASSIGNOR TO CALIFORNIA CORRUGATED CULVERT COMPANY, OF BERKELEY, CALIFORNIA, A CORPORATION OF CALIFORNIA

MAKING SPIRAL WELDED PIPE

Application filed October 18, 1927. Serial No. 226,879.

The present invention relates to the art of making spiral welded metallic pipe, and has for its principal object the provision of a welded seam, of greater thickness than the adjacent metal, which can be simply and rapidly made without the addition of extra metal from an outside source.

This object is achieved, broadly, by crowding the edges of the joint together so forcibly that they have a tendency either to be upset or to over-lap. The result is that when said edges are rendered plastic or fluidic by the welding heat, instead of actually over-lapping or being upset, the pressure forces them together to form a perfect weld, of greater thickness than the body of the pipe. Such a thickened weld is of advantage in insuring a strength at least equal to that of the surrounding metal, and also in providing a helical reinforcing rib for the pipe.

By this means, moreover, I am able to use a lower degree of heat than is possible in making a pure fusion weld in the absence of pressure, and at the same time to produce a more even and perfect weld, without the necessity for such accurate control of temperature as is necessary in the fusion weld. It is entirely possible, however, to make a fusion weld, if such be desired, with the same thickened effect. I am also able to use a gas flame, since no extra metal is needed, such as is sometimes supplied by an electric arc from a metallic electrode.

My invention will be more completely described in the following specificatiaon, which should be read with the understanding that the form, construction, arrangement, and use of the several parts may be varied, within the limits of the appended claims, without departing from the spirit of the invention as set forth in said claims.

Reference should be had to the accompanying drawings, wherein:—

Fig. 1 is a partly diagrammatic plan view of a simple form of apparatus for carrying out the invention.

Fig. 2 is a diagrammatic section taken on the line 2—2 of Fig. 1 and enlarged.

Fig. 3 is an end elevation, enlarged, of the pipe guiding means shown in Fig. 1.

Fig. 4 is a transverse section of the meeting edges of the helically wound sheet, showing the relative positions they would assume if no heat were applied.

Fig. 5 is a similar section of the completed weld, showing the effect of the welding heat and the pressure produced by the over-lapping tendency.

In the drawings, the reference numeral 1 designates the sheet of metal which is wound helically into tubular form to make the pipe 2. Inasmuch as any suitable means may be employed for the winding operation, I have merely indicated, in Figs. 1 and 2, three rollers 3, 4, and 5, the roller 3 lying inside the pipe and the rollers 4 and 5 being outside and acting to bend the sheet 1 over said roller 3. guide rollers 6 are also indicated to guide the sheet 1 into the bending rollers 3, 4, and 5 at the proper angle. Any suitable means, not shown, may be employed for feeding the sheet 1 forwardly, and causing it to pass between the bending rollers 3, 4, and 5.

The bending and guide rollers are so positioned, with respect to the width of the sheet, that the rear edge 1$^a$ of said sheet would normally come into abutting relation with the forward edge 1$^b$ at the point A, at which point the two edges are welded together, the pipe 2 coming endwise off the bending rollers 3, 4, and 5 in its completed form.

I provide means for supporting and guiding the pipe 2 as it leaves the bending and welding mechanism, and said means is best formed upon a base 7, Fig. 1, adapted for horizontal swinging movement about a pivot 8 in approximate vertical alignment beneath the welding point A. A triangular frame 9 is mounted upon the base 7, and carries rollers 10, Fig. 3, adapted to contact with the pipe. The rollers 10 are best mounted in swivel offset brackets 11, so that they track upon the pipe after the manner of casters. One of said caster rollers is preferably mounted in an adjustable bracket 12, which may be moved up or down in one leg of the frame 9 by a screw indicated at 13, so that different sizes of pipe can be accommodated. The base 7 rests upon an arcuate rail 14, Fig. 1, and some suitable device, such as a screw and nut mechanism indicated at 15, is provided for moving said base and its pipe guide horizontally about its pivot 8.

If the pipe 2 were allowed to discharge freely from the bending rollers 3, 4, and 5, its axis would be parallel with the axes of said rollers, and it would lie in the position indicated in dotted lines in Fig. 1. The essential feature of my invention, however, resides in offsetting the pipe, preferably toward the right as viewed in Fig. 1, as indicated, in some exaggeration, by the full line position, this being accomplished by shifting the guide base 7 to the right by means of its screw 15.

This offsetting of the pipe causes the meeting edges 1ª and 1ᵇ of the sheet to be crowded together with sufficient force to produce a tendency toward over-lapping, as shown in Fig. 4, but, since the metal is rendered plastic by the welding heat applied at this point, the radial pressure produced by the bending of the sheet over the roller 3 causes the edges to unite to form a perfect weld of greater thickness than that of the sheet 1, as shown in Fig. 5, the inside of the pipe being almost smooth, and the thickened weld or seam forming a helical ridge on the outside. The same result, viz:—a thickened weld, can be produced by bringing the meeting edges into abutting relation, and crowding them together, by properly offsetting the finished portion of the pipe, so forcibly as to cause them to be upset at the point of welding.

Any suitable means may be employed for heating the meeting edges of the sheet in the welding region. Since the metal required to produce the thickened weld is all derived from the edges of sheet itself, there is no need for supplying additional metal, and I am therefore able to use a gas torch, as indicated at 16 in Figs. 2 and 5. Moreover, the pressure applied to the meeting edges by the offsetting of the pipe 2 enables me to make a perfect weld without heating the metal to a fluid condition; in other words, I can make a pressure weld rather than a fusion weld, with consequently less danger of imperfections. However, a fusion weld may be made if desired, with the same thickened result, the pressure of the meeting edges causing them, when fused, to form a weld or seam of greater thickness than that of the sheet.

I claim:—

1. In the manufacture of spiral welded pipe, the method of forming a welded seam greater in thickness than the adjacent metal, which consists in winding a sheet of metal helically into tubular form with its edges in abutting relation, heating the meeting edges of the winding sheet to welding temperature, and crowding said heated edges together, by offsetting the finished portion of the pipe with respect to the axis of winding, to cause them to unite in a thickened seam.

2. In the manufacture of spiral welded pipe, the method of forming a welded seam greater in thickness than the adjacent metal, which consists in winding a sheet of metal helically into tubular form at an angle designed to forcibly crowd the meeting edges of said sheet together in abutting relation, and heating said edges before and during such crowding to cause them to unite in a thickened seam.

In testimony whereof I have signed my name to this specification.

AUGUSTIN J. HAND.